Aug. 26, 1930.  T. DETFURTH  1,774,321
OPERATING MECHANISM FOR RECIPROCATING RODS
Filed Dec. 21, 1928
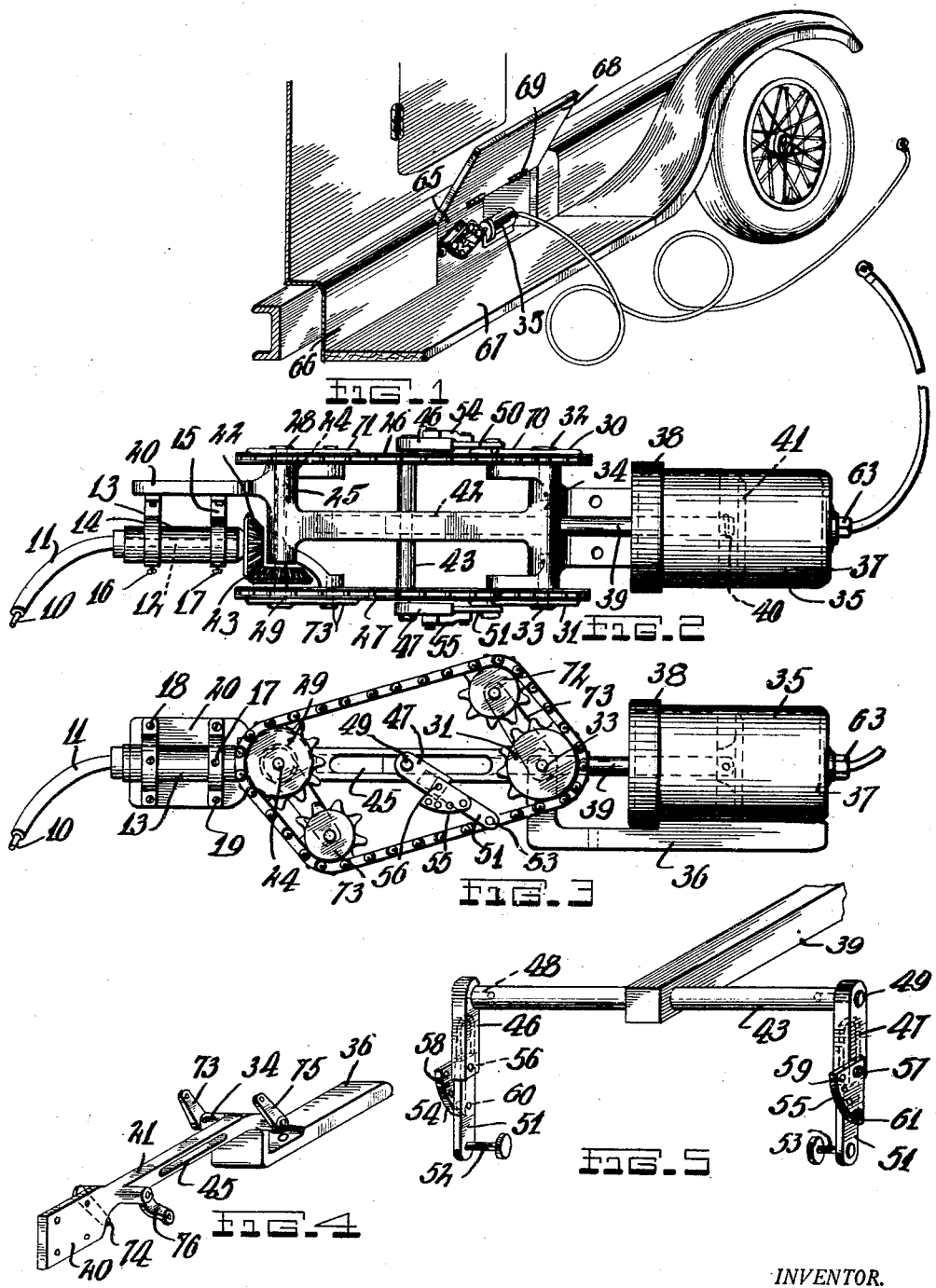
INVENTOR.
TEODORO DETFURTH
BY
ATTORNEY Patented Aug. 26, 1930

1,774,321

UNITED STATES PATENT OFFICE

TEODORO DETFURTH, OF BUENOS AIRES, ARGENTINA

OPERATING MECHANISM FOR RECIPROCATING RODS

Application filed December 21, 1928. Serial No. 327,490.

This invention relates to a new and useful device in the nature of a tire pump for motor vehicles especially adapted to be driven by the motor employed to propel the motor vehicle for the purpose of providing a means of readily and easily inflating the tires of the motor vehicle.

The object of the invention is to provide a power driven tire pump of novel construction and arrangement of parts hereinafter more fully described, claimed and illustrated in the accompanying drawings.

Fig. 1 illustrates my improved device as same would appear when installed in a motor vehicle.

Fig. 2 is an enlarged top plan view of my improved device.

Fig. 3 is a side elevational view thereof.

Fig. 4 is a perspective detail view of the frame or support member.

Fig. 5 is a fragmentary view of the pump rod and adjustable links as embodied in my improved device.

As here embodied my improved tire pump comprises a flexible shaft 10 enclosed in a suitable flexible tubular casing 11, such as is usually employed to drive speedometers or the like. The flexible shaft 10 is secured in the usual well known manner to a shaft 12 rotatively mounted in a barrel 13 or tube. The tube 13 is rigidly held in the straps 14 and 15, by means of the threaded members 16 and 17. The straps 14 and 15 are secured by means of the threaded members 18 and 19 to the extended portion 20 of a one piece frame 19, or support member.

A bevel pinion 22 is secured to one extremity of the shaft 12 and meshes with a bevel pinion 23 secured to a shaft 24, rotatively mounted in a transversely extended portion 25 of the frame 19.

A pair of endless flexible members 26 and 27, preferably link chains are extended over the sprocket wheels 28 and 29, secured to the extremities of the shaft 24 and over similar sprocket wheels 30 and 31. The sprocket wheels 30 and 31 are rotatively mounted on the stub shafts 32 and 33, carried in and extended from the transverse extended portion 34 of the frame 19. The endless flexible members 26 and 27 are also extended over the idler pulleys 70, 71 and 72, 73, respectively. The idler pulleys 70, 71, 72 and 73 are rotatively mounted on pins carried in the extended elements 74, 75, 76 and 77, or arms, of the frame 19, the arms 73 and 75 are upwardly extended, and the arms 74 and 76 are downwardly extended somewhat above and below the first mentioned sprockets as clearly shown in Fig. 3.

A pump cylinder 35 or barrel is mounted on the extended portion 36 or extremity of the frame 19. The cylinder 35 is of tubular construction, closed at one end as at 37, and has removably secured thereto at its other extremity a cap 38. A pump rod 39 is slidably mounted in the cap 38, and has secured thereto, at its enlarged extremity 40, suitable packing 41, so as to provide an air pump. The pump rod 39 is extended somewhat outwardly from the cap 38, and slidably engages in an opening 42 formed in the main portion of the frame 19.

A rod 43 is secured intermediately to the extended portion of the pump rod 39, positioned at approximately right angle to the said pump rod. The rod 43 extends through elongated openings 45 formed in the main portion of the frame 19.

A pair of links 46 and 47 are pivotally attached, as at 48 and 49, to pins carried in the extended extremities of the rod 43. Extension members 50 and 51, slidably engage in openings formed in the links 46 and 47, and extend therefrom and have secured thereto pins 52 and 53, a means of attaching same to the flexible chains 26 and 27, respectively.

A pair of locking plates 54 and 55 are pivotally attached as at 56 and 57 to the extended extremities of the links 46 and 47. The locking plates 54 and 55 are of flat disc construction, and have formed therein a plurality of apertures 58 and 59, unequal distant from the pivot points 56 and 57. These apertures 58 and 59 are adapted to receive the pins 60 and 61, which are secured to the above mentioned extension members 50 and 51. The above described construction is such as will permit the extension members 50 and 51 to be held in any desired extended positions relative to the links 46 and 47 for the purpose as hereinafter set forth.

A flexible member 62, preferably a rubber hose, is secured at one extremity, as at 63 to the closed end 37 of the pump cylinder 35, and has secured thereto at its free extremity a tip 64 or nozzle such as is usually employed for the purpose of connecting the hose 62 to the valve stem of the tire which is desired to be inflated by my improved device.

In Fig. 1 of the accompanying drawing, I have shown my improved device located in a compartment 65, provided under the side splash apron 66 of a motor vehicle adjacent to the running board 67. A door 68 is hinged as at 69 to the splash apron 66, and is adapted to enclose or cover the compartment 65, when my improved device is not in use. It is understood that I do not necessarily limit the attaching of my improved device to the particular place as above set forth but to any suitable, convenient location as may be desired.

The above mentioned flexible shaft 10 and flexible tube 11 are extended from the shaft 12 and barrel 13 and are suitably connected to any convenient, accessible rotating member of the motor employed to propel the motor vehicle, a suitable, conventional means of engaging and disengaging the flexible shaft and tube being employed. The latter mentioned elements do not constitute a material part of my invention and are not shown in the accompanying drawings. It is also understood that the shaft 10 and tube 11 may be similarly attached to any suitable member of the transmission of the motor vehicle.

It is obvious that the above described construction is such as will permit the air to be compressed in the pump cylinder 35, and forced through the tube 62 into the tire desired to be inflated. The tube 62 being of sufficient length to conveniently reach any one of the tires when mounted on the road wheels of the motor vehicle and also the spare tires, so as to permit same to be inflated without removing the tires from their respective places. It is also obvious that the effective stroke of the pump may be varied by the manipulation of the above mentioned locking plates, as a means of securing the proper desired range of air pressure.

Having thus described my invention what I claim as new and desire to secure by United States Letters Patent is:

1. In a device of the class described, a frame formed with an elongated opening, a transverse rod extending through the opening, a link pivotally mounted on each end of the rod, a longitudinal rod for reciprocation mounted on the said transverse rod, extension members adjustably connected with the free ends of the links, lock plates arranged for holding the extension members at several adjusted positions, pins projecting from the free ends of the extension members, and a means for moving the pins in a closed continuous path for reciprocating the longitudinal rod.

2. In a device of the class described, a frame formed with an elongated opening, a transverse rod extending through the opening, a link pivotally mounted on each end of the rod, a longitudinal rod for reciprocation mounted on the said transverse rod, extension members adjustably connected with the free ends of the links, lock plates pivotally attached to the free ends of the links and formed with apertures unequally spaced from the pivotal points, pins secured to the extension members and engageable in the apertures for holding the extension members in adjusted positions, other pins projecting from the free ends of the extension members, and a means for moving the latter pins in a closed continuous path for reciprocating the longitudinal rod.

In testimony whereof I have affixed my signature.

TEODORO DETFURTH.